Dec. 16, 1958 W. S. LEMMON 2,864,886

FACSIMILE TRANSMITTER

Filed June 29, 1955 2 Sheets-Sheet 1

WALTER S. LEMMON,
INVENTOR

BY Homer R Montague
ATTORNEY

Dec. 16, 1958 W. S. LEMMON 2,864,886

FACSIMILE TRANSMITTER

Filed June 29, 1955. 2 Sheets-Sheet 2

WALTER S. LEMMON,
INVENTOR.

BY Homer R. Montague
ATT'Y.

United States Patent Office 2,864,886
Patented Dec. 16, 1958

2,864,886

FACSIMILE TRANSMITTER

Walter S. Lemmon, Greenwich, Conn., assignor to Radio Industries Corporation, a corporation of New York Application June 29, 1955, Serial No. 518,817
1 Claim. (Cl. 178—7.1)

This invention pertains to a facsimile transmitter, and more particularly to an improved facsimile scanning apparatus of simple construction and improved efficiency.

Facsimile systems generally known and used for the transmission of facsimiles of pictures, text matter or other information over radio channels or wire lines, include at the sending end a transmitter which converts the light and dark portions of the original copy to electrical signals suitable for such transmission. These signals are used to modulate a more or less conventional radio transmitter, or to control the application of tone signals or even direct-current voltages to a transmission line. At the receiving end, the incoming signals are converted to a form suitable for the control of a reproducer. Thus, the incoming signals may control a light valve or a modulated light source where a photographic reproduction is desired, or they may control a reproducer employing a stylus and voltage-sensitive paper, as well known in the art.

Since the accuracy of the reproduction made at the receiving end is to a great extent dependent upon the precision with which the original copy is scanned at the transmitter, it is essential that the transmitter accurately scan the original in a predetermined pattern. Also, since the speed at which the electrical information can be handled over existing transmission circuits is quite large, the efficient use of such a channel requires a relatively high speed at the scanner. One drawback which has not successfully been overcome by the prior art is the conflict between the necessity for relatively massive scanning equipment to achieve rigidity and precision, and the requirement for a high scanning speed which could best be satisfied by simplier devices with fewer and lighter moving parts. Facsimile systems in which the original copy is wrapped about a cylinder which is then scanned in a helical path have the additional drawback that they can handle only discrete sheets of more or less predetermined size; also, considerable time is lost in loading and unloading the original copy with respect to the cylinder.

With the above consideration in mind, it is a principal object of the present invention to provide a scanning transmitter for facsimile systems in which the scanning rate is greatly improved without any loss in the precision with which is produced the electrical information corresponding to the tones of the original copy.

Another important object of the invention is to provide such a scanner in which the moving parts, especially the parts which must be moved at higher speeds, are relatively light, but without any sacrifice of rigidity at points where rigidity is essential to precise work. The design accomplishes this object in part by simplification of the operation mechanism, and in part by the unique design of the elements to take advantage of the inherent capabilities of the scanning principle.

A further object of the invention is to provide a scanner of the above type in which the original copy can be scanned without interruptions for reloading or similar operations; a continuous strip of any desired length can be scanned continuously by means of the present invention.

Yet another object of the invention is to provide an optical scanner which can be operated under conditions of ordinary office illumination; that is, one in which it is unnecessary to provide a dark room or light-tight enclosure for the equipment.

The above and other objects of the invention will best be understood by referring now to the following detailed specification of a preferred embodiment thereof, taken in connection with the appended drawings, in which.

Figure 1:
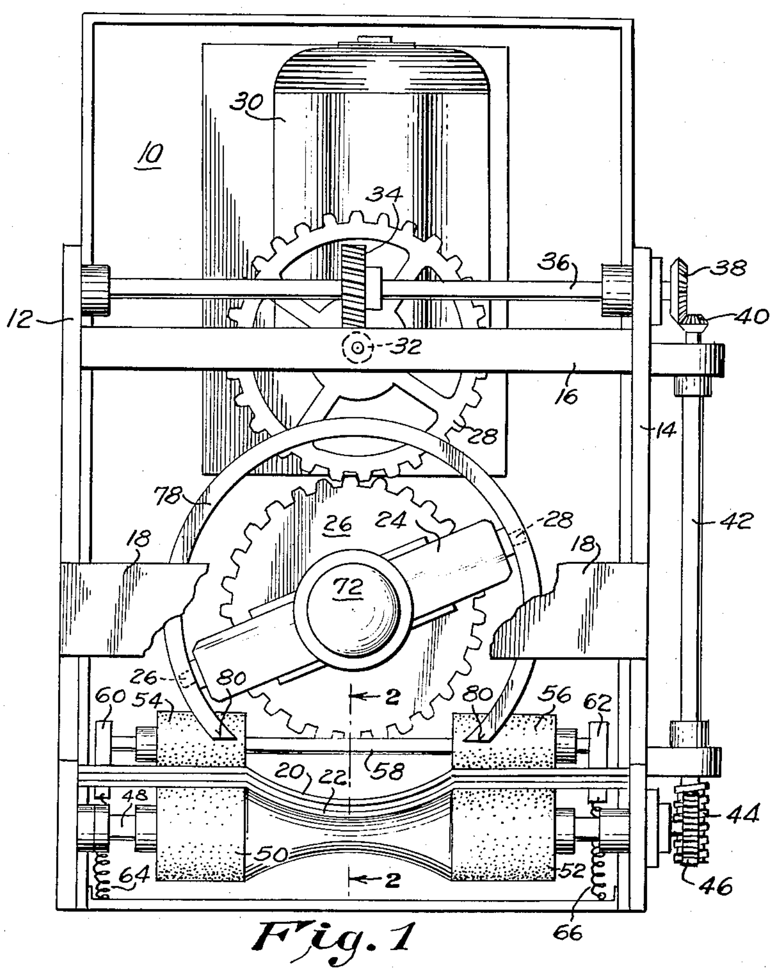
Fig. 1 is a plan view of a preferred embodiment of the novel scanner, showing the general arrangements of its parts.

Generally speaking, the invention provides for scanning the successive transverse lines of a paper strip or sheet which is, at the moment of scanning, constrained to lie along an arc which is concentric with the axis of a multiple optical system. Thus, as the sheet or strip is progressively sent past the scanning station, the part being scanned is caused to assume the shape of a portion of a cylinder. Beyond this point, the strip or sheet is allowed to return to its normal flat condition. The scanning operation is a continuous one, there being multiple scanning heads arranged in a compact unit which rotates so that each head in turn sweeps past an elongated scanning window or aperture slot in one of the paper guides at a point where its curvature is substantially concentric with the scanner axis. A single light source is arranged to direct light at the proper instants through supplementary optics carried along with the scanner optics, the illumination reflected from the scanned line being transmitted to a photocell for conversion to electric signals. Provision is made for preventing random light, not involved in the scanning operation, from reaching the photocell at any time. The paper feed is geared to the drive for the scanner rotation so that substantially perfect alignment is maintained automatically.

The drawings show in several views a preferred physical embodiment of the invention. Referring first to the plan view of Fig. 1, a housing or framework 10 has side plates 12, 14 carrying transverse bearing supports or plates 16, 18. The strip or sheet which is to be scanned travels vertically, in a plane perpendicular to the plane of the drawing, between the paper guides 20 and 22 which are plates formed to the surface of a cylinder in their central portions. The scanner itself is indicated generally at 24 and comprises two sets of scanning optics 26, 28 carried at the ends of the assembly 24 which is journalled for rotation in the support plate 18 and in a lower bearing which is not shown in Fig. 1. As the scanner assembly 24 rotates, each of the optical systems 26, 28 will pass close to the curved portion of paper guide 20 within which is a narrow transverse slot so that light reflected from this region of the original being scanned will enter the scanner optics and thereafter be transmitted to the photocell in a manner to be described below.

Rotation of the assembly 24 is accomplished by a gear 27 meshing with another gear 29 driven through suitable helical gearing from the single drive motor 30. The shaft of gear 29 is journalled in bearing support 16, and carries a worm 32 driving a worm wheel 34 and thereby its shaft 36 and a bevel gear 38 outside the side plate 14. Gear 38 meshes with bevel gear 40 to drive a shaft 42, and a further speed reduction is accomplished by the worm 44 on this shaft which meshes with a worm wheel 46.

Worm wheel 46 drives, through suitable connections, the paper feed shaft 48 which carries resilient frictional paper rollers 50, 52 which therefore drive the original strip or sheet of paper by reason of the engagement of these rollers with the paper through suitable apertures in the marginal portions of paper guide 22. A positive and non-slipping paper drive is assured by a pair of similar paper rollers 54, 56 mounted upon a common shaft 58 carried in arms 60, 62 urged by springs 64, 66 in the direction which ensures that the rollers of each pair will tightly engage the paper through windows in the paper guides 20 and 22, and urges it against rollers 50, 52.

Alternatively, the paper guides 20 and 22 may be of relatively narrow dimensions in the direction of sheet travel, in which case the rubber rolls may engage the paper above or beneath the paper guides.

Figure 2:
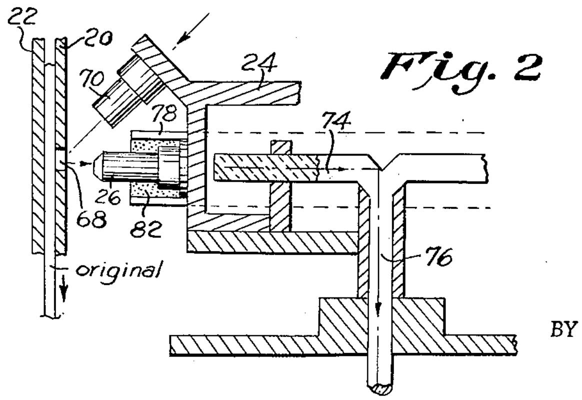
Fig. 2 is a fragmentary diagrammatic view, partly in section on line 2—2 of Fig. 1, clarifying the optical arrangement of the scanner.

Fig. 2 of the drawings is a sectional diagrammatic view taken substantially on the line of 2—2 of Fig. 1. Similar reference numerals designate the same parts as in Fig. 1, the scanning slot in paper guide 20 being designated by numeral 68. It will be seen from Fig. 2 that each end of the scanning assembly 24 carries, besides the scanning optics such as 26, an integral lens assembly 70 for concentrating upon the aperture 68, during the scanning period, a beam of light from a source such as the incandescent lamp 72 of Fig. 1. The lamp is mounted at the upper end of the rotational axis of the scanner. Thus, the part of the copy being scanned is subjected to intense illumination concentrated by the lens system 70 or its counterpart, and the reflected light from the copy is collected by lens 26 and directed into one leg 74 of a light-conducting rod assembly which may be formed of polymerized methyl methacrylate, glass or similar transparent material. This element collects the light from both scanner heads 26 and 28 in turn as they pass the scanning aperture 68, and all of the light is directed through a common leg 76 of the light conducting system to a photocell disposed centrally beneath the scanner assembly.

Inasmuch as a certain amount of illumination would reach the photocell while each scanner head 26, 28 is completing its circuit back to the starting point of a line scan, a shield is provided as indicated at numeral 78. As shown in Fig. 1, this shield is formed as an annular trough coaxial with the axis of scanner assembly 24 and having its forward portion cut away as indicated at numeral 80 so that each scanner lens is free to receive light from the original copy only during the actual scanning period. The inside of the trough is preferably blackened, as indicated at numeral 82 at Fig. 2, to minimize the reflection of any light into the scanner optics at all other times.

Figure 3:
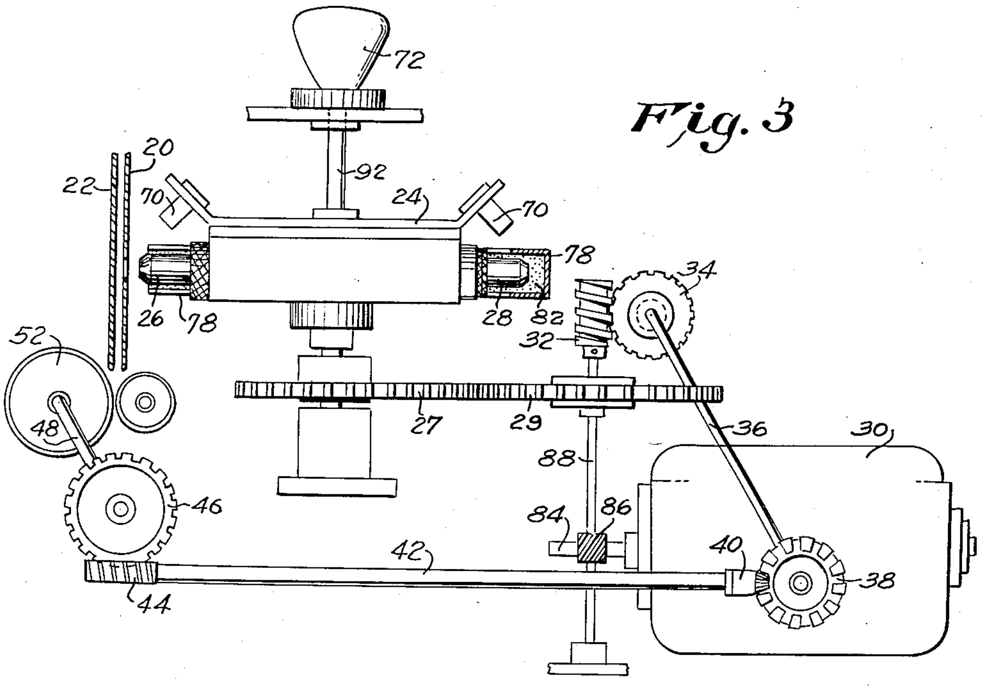
Fig. 3 is a diagrammatic side elevation of the device of Fig. 1, but with parts broken away and shown in section for clarity of understanding.

Fig. 3 of the drawings indicates the apparatus in diagrammatic and partly exploded form. Motor 30 drives a spiral gear 84 meshing with another gear 86 to drive the vertical shaft 88 upon which is fastened gear 29. The latter drives gear 27 and rotates the scanner assembly 24 as described above. The free end of shaft 88 carried the worm 32 which was earlier described as driving worm gear 34, shaft 36, bevel gears 38 and 40, shaft 42, worm 44 and thence the paper drive roller 52. This figure also shows the scanner optics 26, 28 and the shield 78, as well as the illumination optics 70 which travel with the respective scanner lens.

Light source 72 is located at the top of the shaft 92 which carries the scanner assembly 24, but is supported in stationary condition as upon the bearing plate 18. The provision of supplemental illumination optics 70 for each scanner lens permits a single intense light source to be used without requiring slip rings or the like for its current supply, and without necessitating any ventilated housing for the source to reduce the fog illumination reaching the photocell through that scanner lens which is not passing the exposure slot 68.

Figure 4:
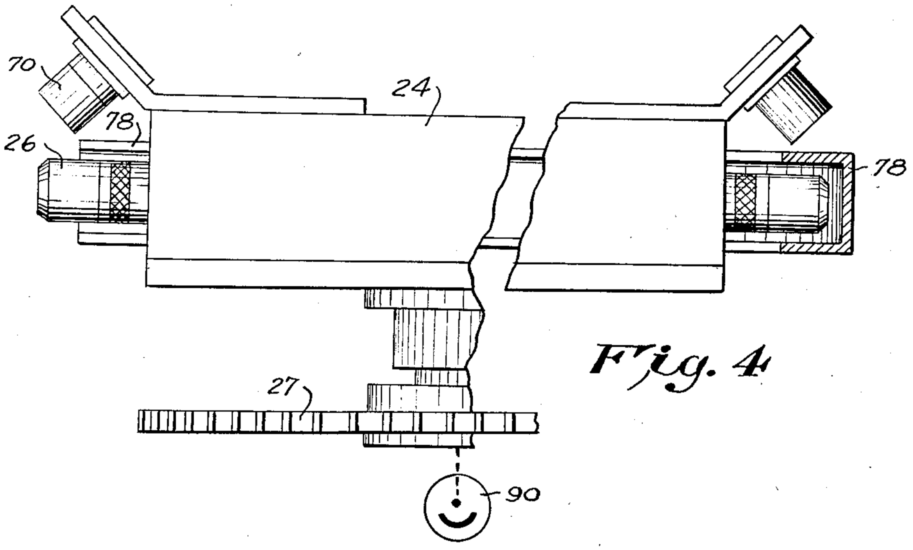
Fig. 4 is an enlarged sectional view of the rotating scanner and its associated parts.

Fig. 4 shows to a larger scale the scanner assembly and the shield 78, and indicates schematically the photocell 90 which collects all the light reflected from the portion of the original sheet to the scanner lens systems. While a pair of diagrammatically opposite scanner lens systems and illuminating optical units have been shown in the embodiment described, it would be obvious that the number of copy lines scanned per revolution of the scanner assembly can be further increased by providing additional scanner heads all of which are arranged to direct their light in succession to the photocell 90. Other modifications of the invention will occur to those skilled in this art, and it is not intended to limit the invention to the details shown or described, except as may be required by the scope of the appended claim.

What is claimed is:

A facsimile line scanner for strip material, comprising means for feeding original strip material, to be scanned, along a substantially linear path; means for deflecting such material, at one point of its travel, into a transversely arcuate form about an axis spaced from said path but generally paralleling the same; a light source fixedly mounted on said axis in position to direct illumination towards the arcuately formed material; a scanner assembly mounted for rotation about said axis and including at least two angularly spaced, radially directed scanner pick-up lens units mounted to swing in rotary paths successively across a transverse line element of said material; individual light-concentrating lens units mounted on said scanner assembly adjacent each of said pick-up lens units and so oriented as to concentrate light from said source directly onto the area of said material being scanned by the adjacent pick-up unit; an arcuate light shield secured in a position concentric with said axis and surrounding the paths of said pick-up lens units during their travel away from said transverse line element, said shield being of channeled cross-section open toward said axis and positioned to closely encompass the extremities of said pick-up lens units during such travel; and drive means for operating said strip material feeding means and said scanner assembly in synchronized relation.

References Cited in the file of this patent

UNITED STATES PATENTS

| | | |
|---|---|---|
| 1,719,392 | Cooley | July 2, 1929 |
| 2,127,331 | Fulton | Aug. 16, 1938 |
| 2,800,527 | Artzt | July 23, 1957 |